2,753,070

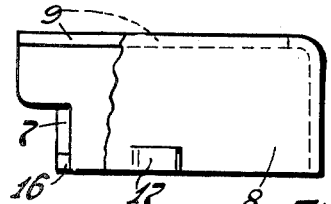
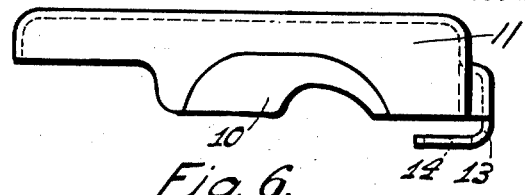
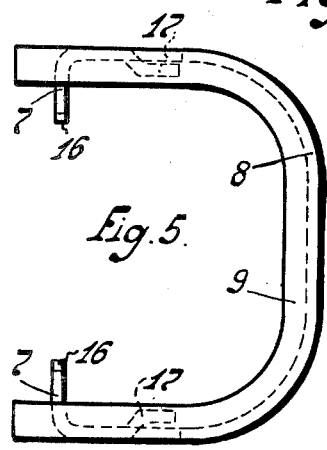
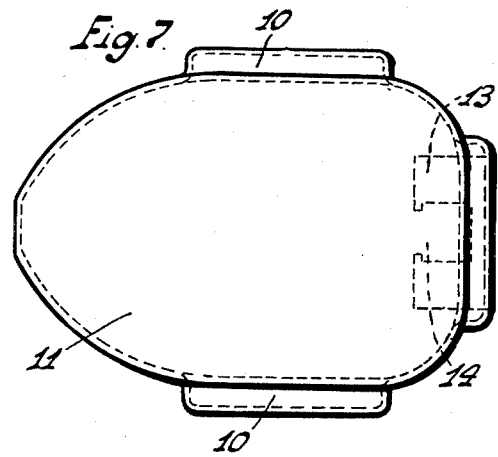
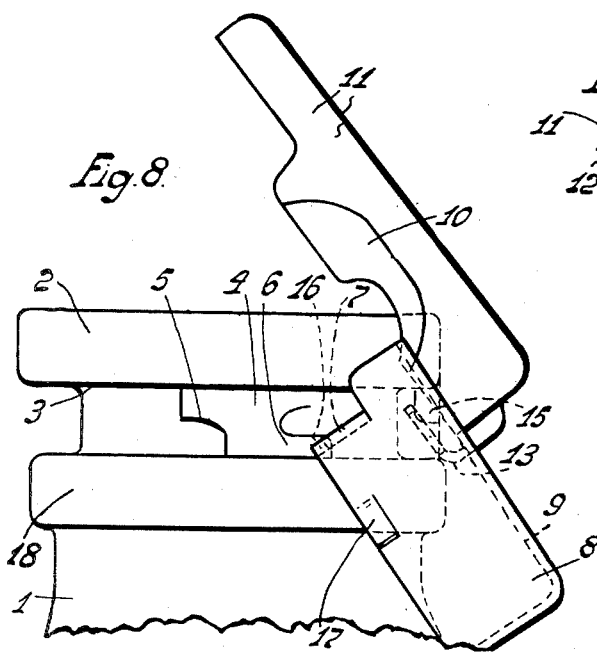
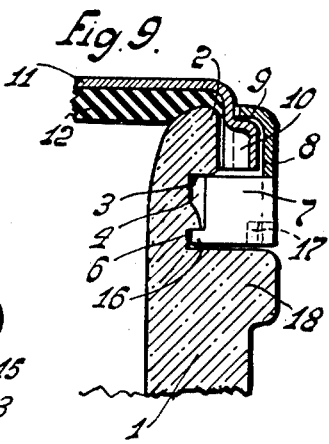

CONTAINER WITH CLOSING DEVICE

Karl Ruetz, Zurich, Switzerland

Application April 6, 1954, Serial No. 421,321

Claims priority, application Switzerland April 16, 1953

4 Claims. (Cl. 215—92)

The present invention relates to a container with a closing device which has a closing cover, a U-shaped closing stirrup coupled to this cover and resting by means of projections in recesses arranged on the container at both sides of the container opening, and guiding edges each running parallel with the plane of the mouth of this opening on the container and along which the projections of the stirrup are displaced.

According to the invention the stirrup has an upper inwardly projecting edge, and the cover has lateral projections at opposite sides and lying under the inwardly projecting edge of the stirrup when the closing device is closed and each projection on the stirrup lies on the underside of the related guiding edge, whilst the recesses of the container for the projections are each provided at one end with a roll-off edge for engagement by the related projection when tilting the stirrup, and at the other end with a slot for receiving a pin on the projection.

An embodiment of the invention, in the form of a bottle with a pouring opening, is hereinafter described in detail, merely by way of example, and is illustrated in the accompanying drawing, wherein:

Figs. 4 and 5 and Figs. 6 and 7 show respectively side and top views of parts of the closing device;

Fig. 8 shows a side view analogous to Figs. 1 and 3 in a position for removing the closing device from the bottle, and Fig. 9 is a fragmentary sectional view on the line IX—IX in Fig. 1 of one half of the bottle mouth and of the closing device.

Figure 1:
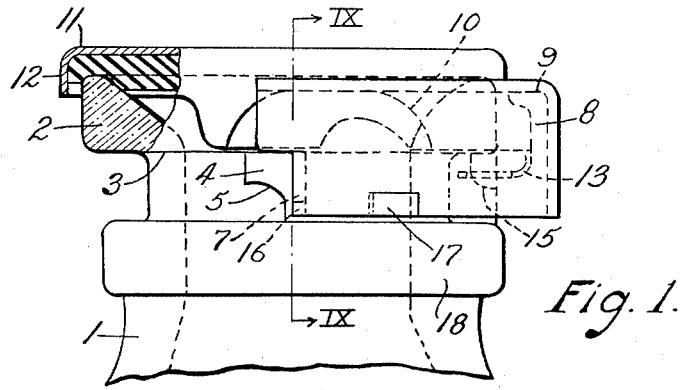
Fig. 1 shows a side view of the mouth of the bottle with the closing device placed on it.
Figure 2:
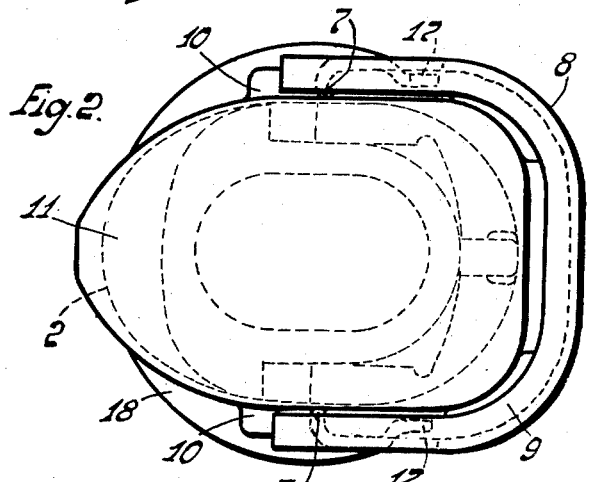
Fig. 2 is a plan view looking down on Fig. 1.

The illustrated bottle 1 has, at the upper end containing the pouring opening, a bulge 2 terminating at the plane of the mouth, with two guiding edges 3 running parallel to that plane. At both sides of the bottle and under these edges, a recess 4 is arranged, which at one side is provided with a roll-off edge 5 at one end and a slot 6 at the other end.

These recesses 4 are adapted to receive projections 7 extending inwardly from the ends of a U-shaped stirrup 8 having an upper, inwardly bent edge 9.

When the bottle is closed, the edge 9 grips over a bulge 10 at each side of a cover 11, which contains an elastic packing 12, while the upper edge of each of the projections 7 lies on the related one of the guiding edges 3, the packing 12 being thereby pressed onto the mouth of the bottle.

At the back end of the cover 11, a lug 13, bent downwards forwards and having an opening 14, is arranged.

A nose 15 of the bottle, projecting downwards from the back end of the mouth, lies in the opening 14.

The projections 7 each have a pin 16 which can enter the slots 6 of the recesses 4. Tongues 17, on the lower edge of the stirrup 8, are bent inwards.

When the closing device is in the closed position (Fig. 1), the stirrup 8 is hinged down onto a bulge 18 of the bottle extending parallel to the bulge 2 and spaced downwardly from the latter and the projections 7 rest with pressure on the guiding edges 3 in such a way that the edge 9 of the stirrup 8 presses the cover 11 and the packing 12 onto the mouth of the bottle 1 by engagement with the bulges 10.

For opening the bottle or for raising the cover 11 (Fig. 3), the stirrup is tilted with the projections 7 on the roll-off edges 5. The tongues 17 thereby pass under the lateral edges of the cover 11 and raise it at its front end, whilst the rear end swings about the pivots defined by the engagement of the apertured lug 13 with the nose 15.

Figure 3:
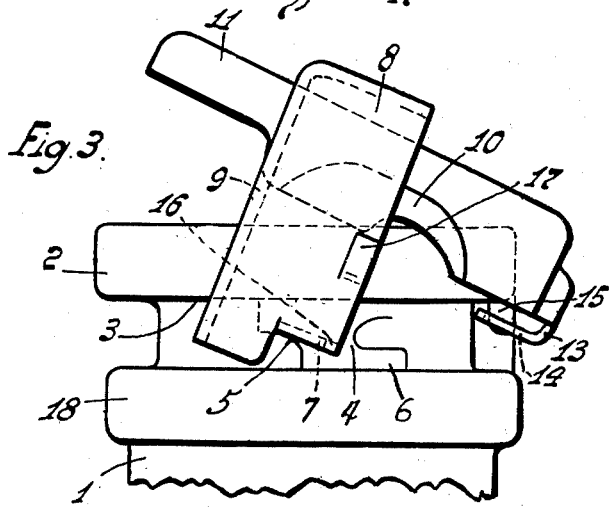
Fig. 3 is a side view analogous to Fig. 1, with the closing device opened.

If the closing device has to be completely detached from the bottle, after the cover has been opened as shown in Fig. 3, it is held as shown in Fig. 8 and the stirrup is swung back so that it comes to lie parallel with the upper side of the cover. The stirrup 8 can then be drawn towards the back (Fig. 8) until each of the pins 16 rests on the rear end of the related slot 6. The cover 11 need then only be manipulated so that its lug 13 is detached from the nose 15 to free the cover, whilst the stirrup 8 is then pushed with the pin 16 out of the slot 6 into the recess 4 and afterwards raised against the guiding edges 3 and withdrawn laterally.

If, however, the stirrup 8 is pressed downwards with the parts in the position shown in Fig. 3, the cover 11 is again moved by means of the engagement of bulges 10 and the edge 9 of the stirrup 8 into the closed position as shown in Fig. 1.

The stirrup and the cover may be made of metal or plastics. The bottle 1 is of glass, but instead of that a sheet-metal container can be adopted, with the portion adjacent to the mouth constructed in a manner similar to that of the described part of the bottle.

Having now particularly described and ascertained the nature of my said invention and in what manner the same is to be performed, I declare that what I claim is:

1. In combination; a container having a pouring opening surrounded by a rim which defines guide edges extending parallel to the plane of said opening and facing in the direction away from the latter, said container further having laterally opening recesses at the opposite sides of said pouring opening below said guide edges with a roll-off edge at one end of each recess; and a closing device comprising a cover, separable means tiltably linking said cover at one end to said container, and a U-shaped, tiltable closing stirrup having lateral projections engageable in said recesses and being pressed against said guide edges when said cover and stirrup are in a closed position, the edge of said stirrup which is uppermost when the latter is in said closed position having an inwardly directed flange therealong, and said cover having lateral bulges at the opposite sides thereof which are pressed down from above by said flange of the stirrup in said closed position, said projections of the stirrup riding on said roll-off edges of the recesses when said stirrup is tilted to free said cover for opening tilting of the latter.

2. The combination of claim 1; wherein each of said recesses of the container has a slot at the other end thereof, and each of said projections of the stirrup has a pin thereon engageable in said slot at the related side of the container to permit swinging of said stirrup to a position wherein the cover is free to be bodily removed from said container.

3. The combination of claim 1; wherein said separable means tiltably linking said cover to the container includes a nose projecting downwardly from said rim, and an apertured lug bent downwardly from said one end of the cover and engageable over said nose.

4. The combination of claim 3; wherein said stirrup has inwardly bent tongues engageable upwardly against the lower edges of said cover when said stirrup is tilted upwardly to an open position thereby to tiltably raise said cover from said pouring opening.

References Cited in the file of this patent

UNITED STATES PATENTS

| | | |
|---|---|---|
| 670,292 | Overmyer | Mar. 19, 1901 |
| 758,515 | Fenn | Apr. 26, 1904 |
| 1,114,703 | Overmyer | Oct. 20, 1914 |
| 2,532,641 | Ruetz | Dec. 5, 1950 |
| 2,595,000 | Ruetz | Apr. 29, 1952 |